M. E. Grigsby,
Fruit Strainer.

No. 105,196.   Patented July 12, 1870.

Fig. II.

Witnesses:
Gustave Dietrich
Geo. W. Mabee

Inventor:
Mary. E. Grigsby
Per Munn & Co.
Attorneys.

United States Patent Office.

MARY E. GRIGSBY, OF PUTNAMVILLE, INDIANA.

Letters Patent No. 105,196, dated July 12, 1870.

IMPROVED FRUIT-STRAINING APPARATUS.

The Schedule referred to in these Letters Patent and making part of the same

*To all whom it may concern:*

Be it known that I, MARY E. GRIGSBY, of Putnamville, in the county of Putnam and State of Indiana, have invented a new and useful Improvement in Fruit-straining Apparatus; and I do hereby declare that the following is a full, clear, and exact description thereof, which will enable others skilled in the art to make and use the same, reference being had to the accompanying drawing forming part of this specification.

This invention relates to a new and useful improvement in an apparatus for straining fruit in the process of manufacturing jelly, wines, cordials, &c.; and consists in a series of sieves of varying degrees of fineness, suspended one above another in a properly constructed frame, so that the juice of the fruit shall run through the series of sieves from one onto the next, and so on through the series, and be thus separated entirely from the pulp of the fruit.

In the accompanying drawing—

Figure 2 is a top or plan view, with the upper sieves broken away to show the lower or fine sieves.

Similar letters of reference indicate corresponding parts.

Figure 1:
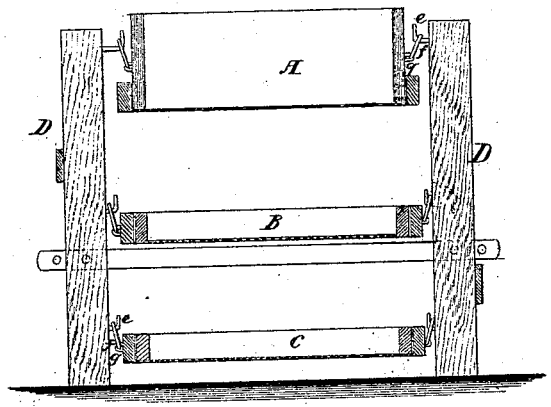
Figure 1 represents a vertical section of the apparatus on the line $x \, x$ of fig. 2.
Figure 1:
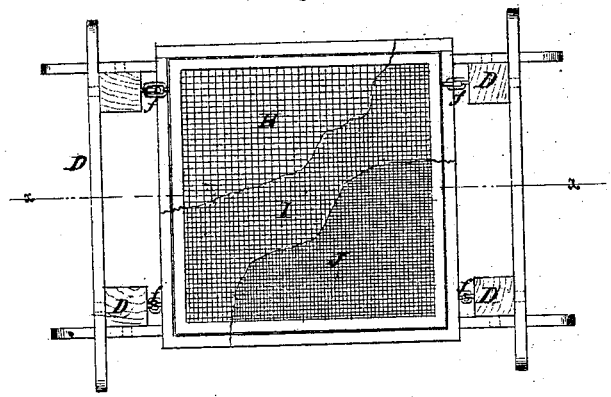

In this example of my invention I show three sieves, marked A, B, and C.

A is the upper and coarsest sieve;
B is the next, and a finer sieve than A; and
C, the lower sieve, is finer still.

Each sieve is suspended from the posts of a square or rectangular frame, D, by means of hooks or screws $e$ in the posts of the frame, and links $f$, which are attached to the sieve-frames by staples $g$.

H, I, and J represent the different kinds of wire gauze or cloth of which the sieve-bottoms are made.

The fruit to be strained is placed in the upper and larger as well as coarser sieve A. A portion of the pulp will descend onto the next sieve B, and some will pass through that sieve and into the lower sieve C.

Other sieves or strainers still finer may be added, so that no pulp shall be found in the juice when the straining is completed.

By the ordinary method the juice is extracted by squeezing the fruit in a bag or rubbing it through a sieve or strainer.

It is impossible to separate the juice perfectly from the pulp in this manner, or to make clear, transparent jelly by such a process.

The fruit should not be squeezed or stirred. It should simply lie and drain.

By combining a number of sieves, and allowing the juice to find its way through them according to my invention, all that is desirable in the fruit for making pure, clear jelly is obtained without trouble, and in the most perfect and easy manner.

Having thus described my invention,

I claim as new and desire to secure by Letters Patent—

The arrangement of a series of sieves, A B C, of varying degrees of fineness, in connection with frame D, hooks $e$, and staples and loops $f$ and $g$, as shown, for the purpose set forth.

MARY E. GRIGSBY.

Witnesses:
WM. A. GRIGSBY, Sen.,
WM. A. GRIGSBY, Jr.